Dec. 21, 1926.
J. PUFF
1,611,556
BAKING OVEN
Original Filed Nov. 3, 1922    2 Sheets-Sheet 1
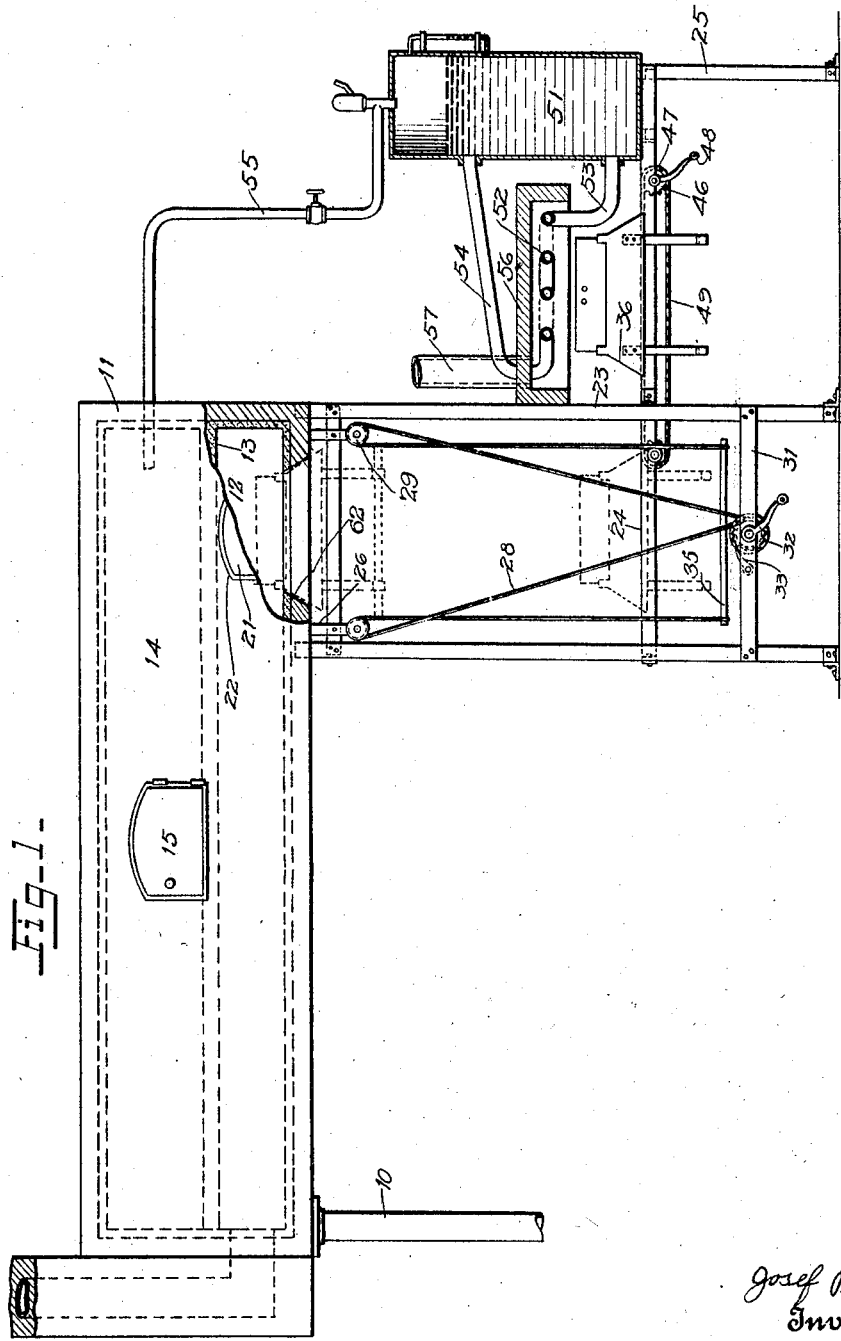
Josef Puff
Inventor
By his Attorney Otto R. Springenberg Dec. 21, 1926.
J. PUFF
1,611,556
BAKING OVEN
Original Filed Nov. 3, 1922   2 Sheets-Sheet 2
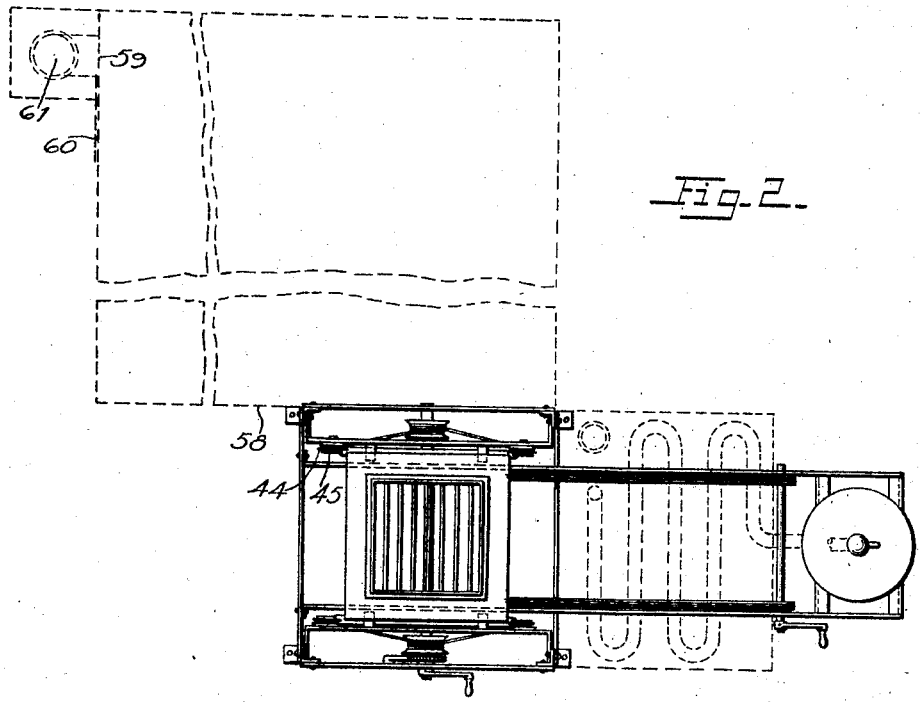
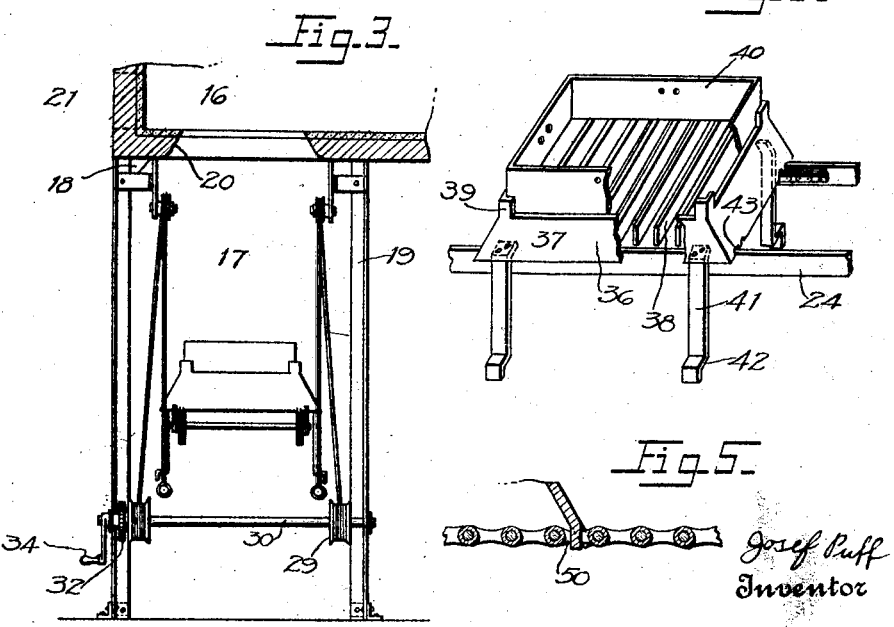

Patented Dec. 21, 1926.

1,611,556

UNITED STATES PATENT OFFICE.

JOSEF PUFF, OF NEW YORK, N. Y.

BAKING OVEN.

Application filed November 3, 1922, Serial No. 598,757. Renewed May 12, 1926.

This invention relates to baking ovens and it particularly relates to ovens which are heated with the gases obtained by the combustion of solid fuel, as for instance coal, upon a grate.

The main object of the invention is to provide means by which the heating of the oven can be accomplished with greater precision according to the requirements of the goods so as to furnish them in a superior quality than one obtains them in an oven with a less perfect regulation of the temperature.

Another object of the invention is to provide means for heating the furnace under conditions which will allow a saving of fuel and which will make it unnecessary to dampen the fire from the time the baking oven is on temperature by, for instance, putting ashes, or water on the glowing fuel thereby creating obnoxious gases endangering the health of the working men.

A further object of the invention is to supply means by which the glowing fuel is used for the generation of steam from the moment the baking oven is on temperature, which steam is admitted into the baking oven for the improvement of the baking process.

With these and other objects in view, which will appear as the description proceeds, my invention consists in the construction and arrangement of parts shown and described and hereinafter claimed.

By way of example I am going to describe my invention in connection with an old fashioned furnace, though any other baking oven heated by the combustion of solid fuel is amenable to operation by my new invention. In the furnace described below the combustion gases enter at one of the corners, strike in a diagonal direction through the flue and leave same in the diagonally opposite corner.

In the drawings which form a part of this specification, Fig. 1 shows a top view, same being partially a horizontal sectional view taken along line A—A of Fig. 2 through the heating arrangement and the steam boiler.

Fig. 2 shows a front elevation, being in part a horizontal vertical section through the steam boiler and the coil connected therewith, part of the front walls being taken off so as to allow a view on the complete heating arrangement.

Fig. 3 shows a cross-sectional view along line B—B of Fig. 2.

Fig. 4 is a perspective view of the grate.

Fig. 5 illustrates on a slightly enlarged scale how the grate, holding the burning fuel, is engaged by the endless chain for the purpose of being forwarded alternately to either side.

In the drawings 10 denotes upright columns supporting a baking oven 11 consisting of a flue 12 separated by the wall 13 from the baking oven or chamber 14 which has a working door 15 for the charge or discharge of goods. The main flue 12 is connected by a short channel 16 with a shaft 17 of any suitable, but preferably square cross-cut. According to the above premises shaft 17 is adjoining the oven 11, for instance at its right front corner. The shaft 17 is formed by the walls 18, held by the angle irons 19, and is crowned at its top by a heavy upwardly tapering frame 20, of cast iron, secured in and surrounded by wall 18 forming the channel 16 which is of preferably rectangular section and which has at its front end a door 21 hingedly secured to the frame 22, both of which are only indicated by parts, the rest being broken away to allow a view into the interior. One of the walls 18, preferably the outside wall, is only closing the upper side of this side and leaves an opening 23 to admit two parallel rails 24, or other sliding means, which are anchored in the wall opposite opening 23, both rails 24 being at their free end supported by an upright stand 25.

On the lower front edge as well as on the lower rear edge of frame 20, hangers 26 are rigidly secured, said hangers being provided at their lower end with grooved pulleys 27. Ropes 28, of steel wire, pass over said pulleys 27 and are secured with their inwardly located end to a rope pulley 29 (Fig. 4) rigidly secured to a rotary drum 30 arranged in bearings (not shown) located within walls 18 and passing with the front end of its axle through the horizontal bar 31 secured to the angle irons 19. A ratchet wheel 32 is rigidly secured to the front end of the axle of drum 30 with which a pawl 33, hingedly secured to bar 31, is interacting with said ratchet wheel to secure the drum in the position given it by turning the handle 34.

The outside ends of ropes 28 are secured to a bar 35 in such manner that same is always absolutely in a horizontal position; the ropes 28 with said bar 35 form a kind of stirrup. The ropes 28 are secured to pulley 29 at opposite ends and are located laterally to each other in such manner that in turning drum 30 said ropes cannot twist, but that one rope comes on top of the other in an orderly manner so as to guarantee a safe unwinding of the ropes.

36 denotes any suitable heat distributing means, for instance a grate of preferably square cross cut, consisting of a frame with slightly upwardly tapering walls 37 and bars 38, as well as angular corner guides 39 to hold a frame 40 (only partly shown) which can be inserted to hold the fuel together.

To both the front and the rear end wall 37 of the grate 36 hooks 41 are rigidly and perpendicularly secured, the lower bent arm projecting horizontally and outwardly.

Both the side walls 37 are provided with recesses 43 of such form that the upper end or rim of rails 24 will fit into same; also the distance of these recesses 43 in each of the walls 37 is exactly the same as that of the two rails 24 from each other so that grate 36 can be imposed upon said rails 24 and by means of said recesses 43 will be held securely in this position when it is moved in a sideward direction as will be further seen below.

On the inside of said rails 24 a grooved wheel 44 is rotarily secured to a projection 45 and oppositely to each such wheel 44 another such grooved wheel 46 is secured to a rod 47 with bearings in said rails 24 and being turned by handle 48. A wire belt or sprocket chain 49 is laid across pulleys 44 and 46 and a saddle 50 is rigidly secured to said belt 49 so as to have its members stand upright and catch one of the sidewalls 37 on its front and rear.

At the end of rails 24, or at any other suitable place, a steam boiler 51 is provided, a coil 52 being connected with same by pipes 53 and 54. At the dome of said boiler a steam pipe 55 branches off and enters the baking chamber 14. A cover 56, of brick or similar material, provided with a chimney 57, is put over the coil 52.

The flue 12 can be disconnected from the shaft 17 by any suitable means, for instance by a simple damper or plate 58, (Fig. 1) and at the other end the exit 59 can be closed by a damper 60 so as to sever connection with the chimney 61.

Figs. 2 and 3 show that the grate 36 can have various positions inside of shaft 17; from the upper indication it is obvious that the grate 36 fits well into the frame 20, the ribs 62 secured on the inside of the frame acting as guides when grate 36 enters frame 20 and leaving a narrow interstice between frame 20 and grate 36.

Though I am not bound to make the operations in exactly the line as here described, the operation of my new combination furnace having a movable grate in common, can be performed as follows:

Assuming that the oven is cold and that grate 36 is below coil 52, I kindle a fire on said grate 36 and then turn handle 48 so that the belt 49 holding grate 36 by means of the catch or saddle 50, pulls the grate inside shaft 17 until it has the lower position indicated by dotted lines (Fig. 1). The horizontal feet of grate 36 stand then above the bar 35 in the front as well as in the rear; when I then turn handle 34 to lift said bar 35 upwardly and as soon as same strikes against the feet 42, the grate 36 is lifted to soon come into the upper position likewise indicated by dotted lines. In this position, secured by the ratchet wheel and pawl, I maintain the fire as long as necessary, having exit 59 open and adding fuel through door 21 if necessary, while regulating the draft from up the shaft 17 by closing the openings as far as necessary with sheet iron or the like. As soon as the oven 11 is well heated, I take down the grate 36 to the rails 24 where saddle 50 receives the side wall 37 of grate 36 so that I can pull the latter outside by turning handle 48 in the opposite direction. Thus grate 36 is again located below coil 52, filled with water, so that soon generation of steam sets, in which steam is supplied to baking chamber 14 to act on the goods. In this manner the grate, or other heat distributing means, are alternately brought into working relation with the baking oven per se and the steam boiler on the other side; as soon as a drop in the temperature of the baking oven is noticed the grate 36 is hoisted from the steam boiler into the top of the shaft to heat the baking oven, and vice versa it is returned below the coil, or steam boiler, as soon as the oven is sufficiently on temperature. The floor below coil 5$^w$ and that inside shaft 17 is used as ash-pit.

It is obvious that certain details of construction can be accomplished in various different ways without changing the principle of my invention; for instance I may substitute the dampers 58 and 60 by more elaborate constructions, or by automatic devices, furthermore I may add an automatic auxiliary device which controls and safeguards the location of the stirrups 35 below the feet 42 and their striking against the latter when hoisting the stirrup to lift the grate 36, but any such and similar changes come within the scope of my invention.

What I claim is:

1. Means for operating a baking oven, said means including in connection with a baking oven the combination comprising a shaft operatively connected with the baking oven, a steam-boiler operatively connected with the baking oven, heat distributing means movable within said shaft and being adapted to alternately heat the baking oven and the steam-boiler, and of means to alternately bring the heat distributing means in working relation with the baking oven and the steam-boiler.

2. Means for operating a baking oven, said means including in connection with a baking oven the combination comprising a shaft operatively connected with the baking oven by a channel having an inlet, a steam-boiler operatively connected with the baking oven, heat distributing means movable within said shaft and being adapted to fill the opening at its top and to alternately heat the baking oven and the steam boiler, and of means to alternately bring the heat distributing means in working relation with the baking oven and the steam-boiler.

3. Means for operating a baking oven, said means including in connection with a baking oven the combination comprising a shaft operatively connected with the baking oven, a steam-boiler having an outside heating coil and being operatively connected with the baking oven, a grate movable within said shaft and being adapted to fill the opening at its top and to alternately heat the baking oven and the steam-boiler, and of means to alternately bring the heat distributing means in working relation with the baking oven and the steam-boiler.

4. Means for operating a baking oven, said means including in connection with a baking oven and a steam boiler operatively connected with said baking oven, the combination comprising a shaft operatively connected with the baking oven, a grate movable within said shaft and being adapted to fill the opening at its top, a pair of rails adapted to slidingly engage the said grate, hoisting means engaging the grate and being adapted to bring the grate into engagement with the rails, and means to impart motion to the grate in either direction along the rails.

5. Means for operating a baking oven, said means including in connection with said baking oven a steam boiler and a movable grate adapted to be alternately disposed in working relation with said baking oven and the steam boiler, the combination of aforesaid baking oven with a shaft, adapted to receive the said movable grate.

6. Means for operating a baking oven, said means including in connection with said baking oven, provided with a shaft, a steam boiler, a movable grate and means operatively engaging said grate to impart vertical motion to the same, the combination of aforesaid elements comprising a pair of rails, anchored at one end within the said shaft and at the other below the steam boiler, said rails being adapted to operatively engage and to guide the movable grate in its motion in either direction along the grate.

In testimony whereof, I have signed my name to this specification this 14th day of October, 1922.

JOSEF PUFF.